United States Patent [19]
Tomita

[11] Patent Number: 6,081,377
[45] Date of Patent: Jun. 27, 2000

[54] POLARIZED LIGHT SYNTHESIZING DEVICE AND DISPLAY DEVICE USING THE SAME

[75] Inventor: Junji Tomita, Kawasaki, Japan

[73] Assignee: Fujitsu Limited, Kawasaki, Japan

[21] Appl. No.: 09/236,288

[22] Filed: Jan. 22, 1999

[30] Foreign Application Priority Data

May 27, 1998 [JP] Japan .................. 10-145785

[51] Int. Cl.[7] ...................................... G02B 5/30
[52] U.S. Cl. .................. 359/495; 359/494; 359/497; 359/500; 349/9
[58] Field of Search ................ 359/494, 495, 359/497, 500; 349/9; 250/339

[56] References Cited

U.S. PATENT DOCUMENTS

| | | | |
|---|---|---|---|
| 5,039,855 | 8/1991 | Kemeny et al. | 250/339 |
| 5,073,830 | 12/1991 | Loucks | 359/495 |
| 5,715,085 | 2/1998 | Takatori et al. | 359/495 |

*Primary Examiner*—Cassandra Spyrou
*Assistant Examiner*—Craig Curtis
*Attorney, Agent, or Firm*—Staas & Halsey, LLP

[57] ABSTRACT

Light emitted from a light source is separated into ordinary light and extraordinary light by a polarization separation element including a polarized light synthesizing device. The ordinary light is regulated in a direction of the polarization plane by a phase difference plate provided on an aperture member so that the polarization plane becomes the same as the extraordinary light. The lights are then converted into a parallel luminous flux through a condenser lens, and then selectively passed through a liquid crystal panel in accordance with an image so that a large image plane of the image is displayed on a screen.

16 Claims, 11 Drawing Sheets

POLARIZED LIGHT SYNTHESIZING DEVICE AND DISPLAY DEVICE USING THE SAME

BACKGROUND INVENTION

1. Field of the Invention

The present invention relates to a polarized light synthesizing device for synthesizing two linearly polarized lights which are mutually different in polarization plane, and a display device using the same.

2. Description of the Related Art

As a display device capable of displaying an image on a screen with a large image plane, there has been developed a so-called light valve display device. Recently, of this type light valve display device, there is watched a liquid crystal light valve device which is capable of implementing a high resolution, and is independent of magnetism.

The liquid crystal light valve device is basically arranged in such a manner that light from a light source is applied to a liquid crystal panel, and transmitted light, according to an image formed on the liquid crystal panel, is introduced onto a screen with an enlargement, so that a large image plane of the image is displayed. In this case, the liquid crystal panel forms an image using a polarizer and an optical change by the dielectric anisotropy of the liquid crystal. When light from the light source is converted into linearly polarized light by the polarizer, the half of it is lost.

In view of the foregoing, there is proposed a liquid crystal light valve display device 4 (FIG. 18) using a polarized light synthesizer device 2 shown in FIG. 17 (Japanese Patent Application Laid-Open Gazette Hei.4-310903). According to the liquid crystal light valve display device 4, after light L from a light source 6 is introduced via an aperture member 8 into a condenser lens 10 to form a parallel luminous flux, the parallel luminous flux is converted into the linearly polarized light by the polarized light synthesizer device 2 and then introduced to a liquid crystal panel 12. The linearly polarized light introduced to the liquid crystal panel 12 penetrates a polarizer 14 disposed at the front stage of the liquid crystal panel 12, selectively penetrates a liquid crystal 18 controlled in accordance with an image signal generated from a liquid crystal control unit 16, penetrates a polarizer 20 disposed at the back stage of the liquid crystal panel 12, and is introduced via condenser lenses 22 and 24 into a screen 26 thereby displaying a large image plane of image.

Here, the polarized light synthesizer device 2 is arranged in such a manner that a lenticular lens 30, in which a plurality of semi-columnar convex lenses are arranged, is disposed at the incident side of a polarization panel 28 for converting the light L into the linearly polarized light, while a plurality of line-like shaped phase difference plates 32 associated with coupling portions of the plurality of semi-columnar convex lenses constituting the lenticular lens 30 are disposed on the emission side of the polarization panel 28. Incidentally, a direction of a slanting line appended to the polarization panel 28 denotes a superposing direction of a plurality of polarization separation working films.

In this case, the light L consisting of the parallel luminous flux introduced by the polarized light synthesizer device 2 is concentrated by lenticular lens 30, and then separated by the polarization panel 28 into two linearly polarized lights which are perpendicularly intersect one another in the polarization plane. One of the two linearly polarized lights is introduced to the liquid crystal panel 12 through slits between the phase difference plates 32. Another of the two linearly polarized lights is introduced to the liquid crystal panel 12 through the phase difference plates 32 in the form of a linearly polarized light having the polarization direction which is the same as that of said one of the linearly polarized lights. Incidentally, in FIG. 17, the symbol marks "○ and •" and the symbol mark of the both direction arrow denote a direction perpendicularly intersecting the drawing and a polarization plane of the direction along the drawing, respectively.

The light L, which penetrates the polarized light synthesizer device 2 thus arranged, reaches a liquid crystal 18 constituting liquid crystal panel 12 in the form of the linearly polarized light controlled to the polarization plane of the same direction as the polarizer 14, and thereafter be introduced to the polarizer 20 selectively penetrating the liquid crystal 18 in accordance with an image.

However, since the polarization panel 28 constituting the polarized light synthesizer device 2 is formed by superposing a plurality of polarization separation working films, a change of incident angle of light L with respect to the superposing plane may bring about a remarkable degradation of a polarization separation characteristic. Consequently, there is a need to supply to the polarized light synthesizer device 2 a parallel luminous flux which is strictly controlled in parallelism. This causes the fabrication cost of the polarization panel 28 to rise. Further, the polarized light synthesizer device 2 has to be constructed with the same size as the liquid crystal panel 12. This causes the device to be large and thereby further increasing the cost.

SUMMARY OF THE INVENTION

In light of the aforementioned problems, an object of the present invention is to provide apolarized light synthesizing device capable of efficiently converting light into linearly polarized lights and synthesizing the linearly polarized lights with compactness and low cost, and in addition to provide a display device capable of efficiently performing an image display effectively utilizing the light with compactness and low cost.

According to a polarized light synthesizing device of the present invention, light is separated into a normal light and an abnormal light by a polarization separating device and is introduced to an aperture member, and a polarization rotating device provided on the aperture member rotates a polarization plane of at least one of the normal light and the abnormal light and thereby obtaining synthesized lights which are coincident with one another in polarization planes.

Further, according to a display device using the polarized light synthesizing device of the present invention, light emitted from a light source is separated into a normal light and an abnormal light by a polarization separating device and is introduced to an aperture member, and a polarization rotating device provided on the aperture member rotates a polarization plane of at least one of the normal light and the abnormal light and thereby obtaining synthesized lights which are coincident with one another in polarization planes. Next, the lights are applied to a liquid crystal panel which is controlled in polarization planes of the respective pixels in accordance with an image.

DETAILED DESCRIPTION OF THE PREFERRED EMBODIMENTS

Figure 1:
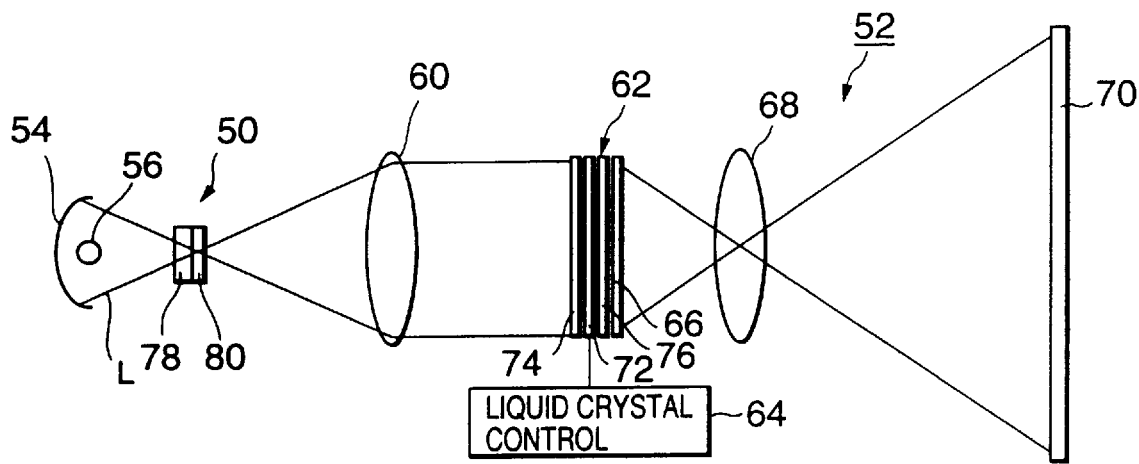
FIG. 1 is a construction view of a liquid crystal light valve display device according to the present embodiment.

FIG. 1 shows a structure of a liquid crystal light valve display device 52 using a polarized light synthesizing device 50 according to the present embodiment. The liquid crystal light valve display device 52 basically comprises: a light source 56, such as a metal halide lamp, having a reflector; a polarized light synthesizing device 50 disposed in the vicinity of a condensing portion of lights L emanated from the light source 56; a condenser lens 60 for condensing lights L, which have been converted into linearly polarized lights by the polarized light synthesizing device 50, to form a parallel luminous flux; a liquid crystal panel 62 through which the parallel luminous flux passes in accordance with an image formed; a liquid crystal control unit 64 for forming on the liquid crystal panel 62 an image according to an image signal; condenser lenses 66 and 68 for condensing the lights L passed through the liquid crystal panel 62, a screen 70 serving as an image display unit for displaying a large image plane of image in accordance with the lights L from the condenser lens 68. The liquid crystal panel 62 is arranged in such a manner that a liquid crystal 72 is sandwiched by two polarizers 74 and 76. With respect to liquid crystal 72, it is possible to adopt a single-plate system or a three-plate system using a dichroic filter mirror.

Figure 2:
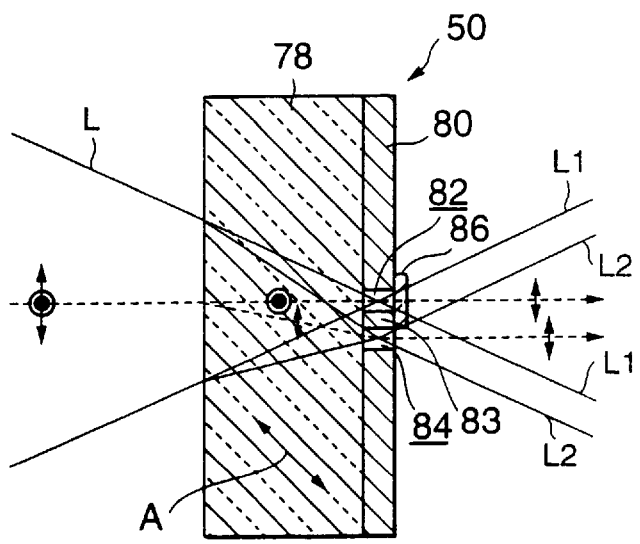
FIG. 2 is a sectional construction view of a polarized light synthesizing device according to the present embodiment.

The polarized light synthesizing device 50 comprises, as shown in FIG. 2, a polarization separation element 78 disposed at the light source 56 side, and an aperture member 80 disposed at the condenser lens 60. The aperture member 80 is provided with a phase difference plate 86 which serves as a polarization rotator element.

The polarization separation element 78 is composed of a double refractive element in which an optical axis is formed or cut so as to incline (an arrow A direction) with respect to an optical axis of the lights L emitted from the light source 56, and the incidence plane and the emission plane are parallel to one another. Consequently, the light L applied to the polarization separation element 78 is separated into two mutually different linearly polarized lights of normal light L1 and abnormal light L2. It is noted that any one is acceptable, as to the optical axis, which makes it possible to separate the light L to the normal light L1 and the abnormal light L2, and it is not restricted to the arrow A direction. The directions of the polarization planes of the normal light L1 and the abnormal light L2 are denoted by the symbol marks "○ and •" and the symbol mark of the both direction arrow which is a direction along the surface of the drawing.

Figure 3:
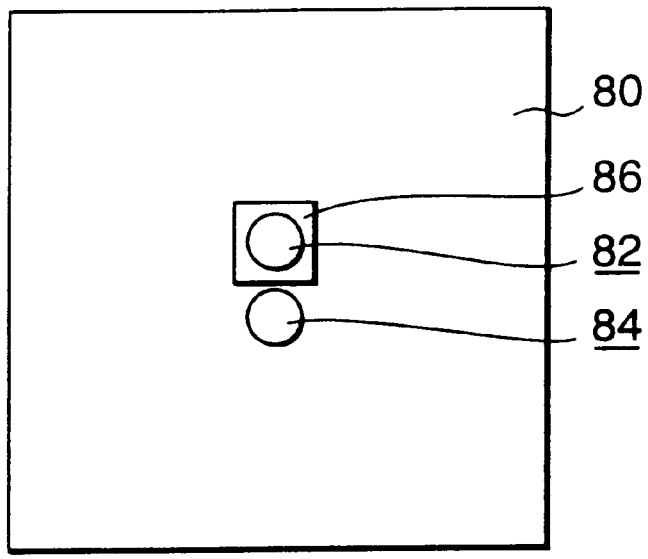
FIG. 3 is a front elevation of the polarized light synthesizing device shown in FIG. 2.

The aperture member 80 is a spatial filter and is composed of an optical shield plate for eliminating unnecessary lights. The aperture member 80 has two openings 82 and 84 provided in the vicinity of the condensing portion of the normal light L1 and the abnormal light L2. At the opening 82 through which the normal light L1 passes, there is disposed the phase difference plate 86 comprising a ½ wavelength plate for rotating the polarization plane of the normal light L1 by 90° to be coincident with the polarization plane of the abnormal light L2 (cf. FIG. 3). It is acceptable that the polarization plane of the abnormal light L2 is rotated by 90° instead of that the polarization plane of the normal light L1 is rotated by 90°.

Incidentally, as the polarization separation element 78 and the phase difference plate 86, it is possible to use the double refractive element. As the double refractive element, uniaxial double refractive crystal or biaxial double refractive crystal, for example, calcite, lithium niobate, crystal, rutile, potassium dihydrogenphosphate, and mica are applicable. In view of the separation distance of the luminous flux, in the polarization separation element 78, since thickness of the double refractive element is able to be reduced with greater difference between the refractive index as to the normal light L1 and the refractive index as to the abnormal light L2, it is preferable that thecalcite (no=1.69, ne=1.49), which is relatively large in the difference, is adopted.

The polarized light synthesizing device 50 and the liquid crystal light valve display device 52 using the same are basically arranged in a manner as described above. Next, there will be described the effect of those devices hereinafter.

The lights L directly emitted from the light source 56, or the lights L reflected by the reflector 54 are condensed onto the polarized light synthesizing device 50. Light L introduced onto the polarized light synthesizing device 50, which is in a random polarization state, is separated into ordinary light L1 and extraordinary light L2 by the polarization separation element 78 which is set up in an arrow A direction (FIG. 2) in direction of the optical axis. The ordinary light L1 and extraordinary light L2 thus separated are condensed onto the openings 82 and 84 of the aperture member 80, respectively. Incidentally, the ordinary light L1 is a linearly polarized light having a polarization plane perpendicularly intersecting the surface of FIG. 2, and the extraordinary light L2 is a linearly polarized light having a polarization plane along the surface of FIG. 2.

The extraordinary light L2, which passes through the opening 84 of the aperture member 80, is introduced to the condenser lens 60 in the state that the direction of the polarization plane is maintained. On the other hand, the ordinary light L1, which passes through the opening 82 of the aperture member 80, is rotated 90° in the polarization plane by the phase difference plate 86 disposed on the opening 82 and is introduced to the condenser lens 60 in the form of the ordinary light L1 having the same polarization plane as the extraordinary light L2.

Figure 18:
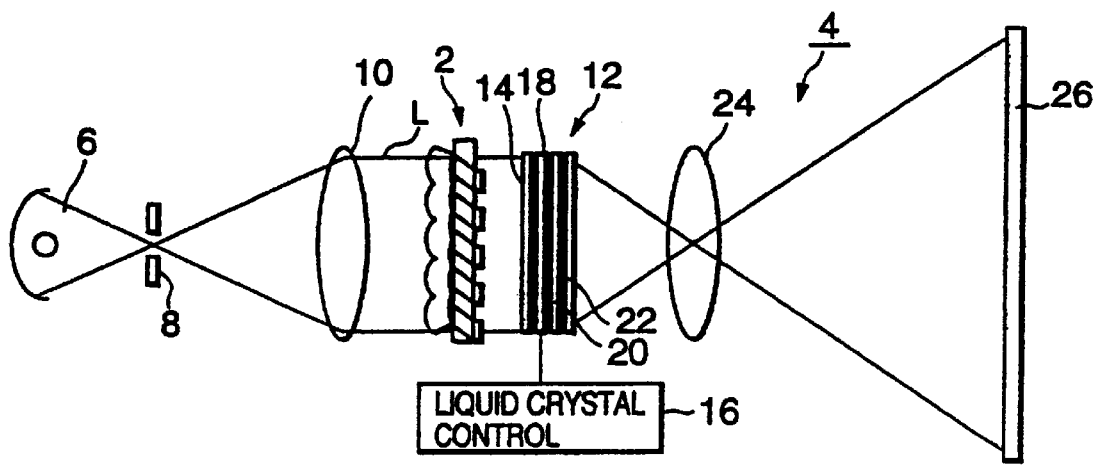

Here, since the polarized light synthesizing device 50 having the function as mentioned above is disposed in the vicinity of the condensing portion of the lights L, it is sufficient for the polarized light synthesizing device 50 to have a range capable of receiving the light L, and there is no need to have the size of the arrangement corresponding to the liquid crystal panel 12 as in the earlier technology shown in FIG. 18.

The condenser lens 60 condenses the ordinary light L1 and extraordinary light L2, which are coincident with one another in the polarization plane, to form a parallel luminous flux, and thereafter introduces the parallel luminous flux to the liquid crystal panel 62. The polarization separation element 78 constituting the polarized light synthesizing device 50 is set up in such a manner that the incidence plane and the emission plane are parallel to one another. Consequently, it does not happen that an angular difference between the ordinary light L1 and extraordinary light L2 after passing through the polarization separation element 78 in a travelling direction occurs. Thus, since the ordinary light L1 and extraordinary light L2 are incident at the same incident angle with respect to the condenser lens 60, it is possible to obtain the very good parallel luminous flux.

Figure 4:
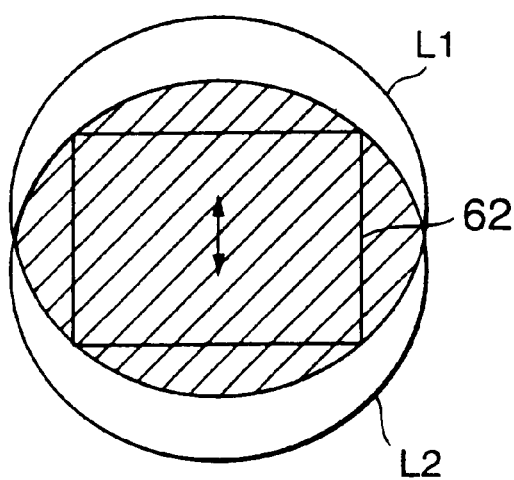
FIG. 4 is an explanatory view useful for understanding a liquid crystal panel illuminated with lights synthesized by the polarized light synthesizing device according to the present embodiment.

FIG. 4 illustrates irradiation ranges of the ordinary light L1 and extraordinary light L2 consisting of the parallel luminous flux introduced onto the liquid crystal panel 62.

In this case, the irradiation ranges of the normal light L1 and abnormal light L2 are mutually shifted by the amount according to thickness of the polarization separation element 78 constituting the polarized light synthesizing device 50. The superimposed area (a diagonal line portion) forms a parallel luminous flux involved in synthesis of the ordinary light L1 and extraordinary light L2. The synthesized parallel luminous flux is aligned in direction of the polarization plane in a direction shown by the arrow.

The parallel luminous flux consisting of the ordinary light L1 and extraordinary light L2 passes through the polarizer 74 set up in such a manner that its polarization plane is coincident with the polarization plane of the parallel luminous flux, without being subjected to the loss, and then selectively penetrates the liquid crystal 72 controlled in accordance with an image signal generated from the liquid crystal control unit 64, and finally passes through the polarizer 76 having the polarization plane which serves to effectively penetrate the light subjected to the effect by the liquid crystal 72. Thus, the enlarged image through the condenser lenses 66 and 68 is displayed on the screen 70. In this case, since the lights L emitted from the light source 56 are regulated in its entirety in the same direction as the polarization plane of the polarizer 74, and are introduced to the liquid crystal panel 62, it is possible to display an extremely high luminance of image.

It is acceptable that the phase difference plate 86 mounted on the aperture member 80 is provided on the opening 84 instead of the opening 82, and the polarization planes of the polarizers 74 and 76 constituting the liquid crystal panel 62 are set up in accordance with the associated situation. It is also acceptable that the phase difference plate 86 is mounted at either of the incidence side and the emission side of the aperture member 80, and alternatively it is acceptable that the phase difference plate 86 is mounted in a unitary body with the opening 82.

Figure 5:
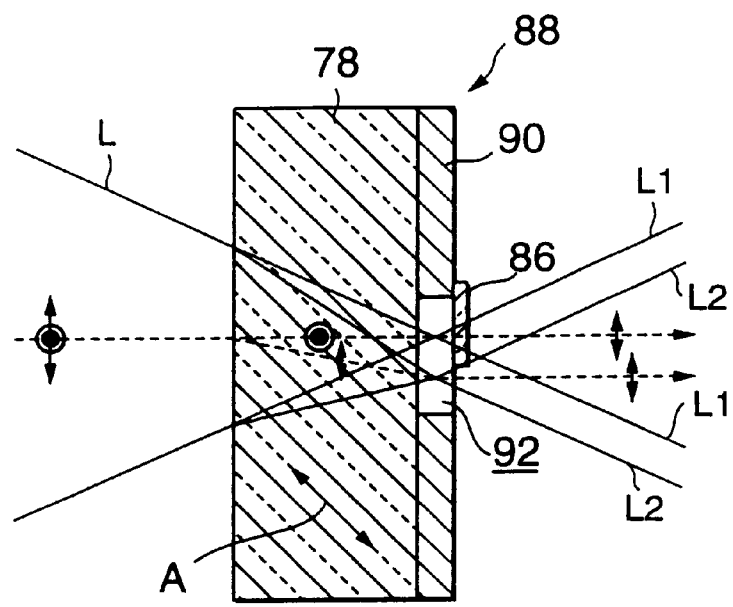
FIG. 5 is a sectional construction view of a polarized light synthesizing device according to an alternative embodiment.
Figure 6:
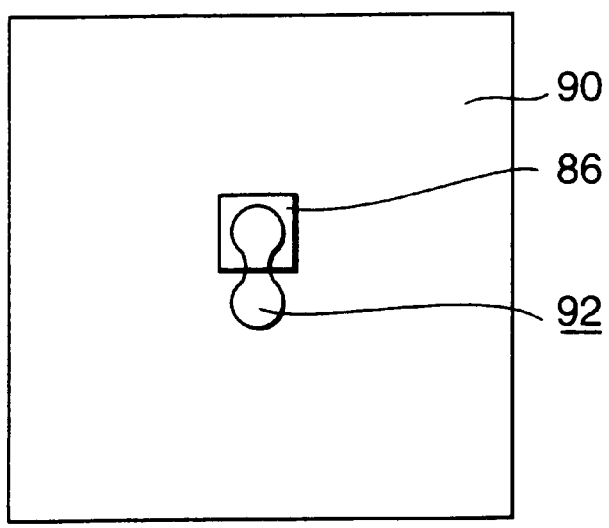
FIG. 6 is a front elevation of the polarized light synthesizing device shown in FIG. 5.

FIGS. 5 and 6 show a polarized light synthesizing device 88 according to an alternative embodiment. An aperture member 90 constituting the polarized light synthesizing device 88 is provided with an opening 92 having a configuration in which two circles are coupled, and one of the circles is covered with the phase difference plate 86. It is acceptable that the shape of the opening 92 is of an ellipse, a quadrilateral and the like.

According to the present embodiment, there is no fear that the ordinary light L1 and the extraordinary light L2 are disturbed by a separation portion 83 provided between the openings 82 and 84, as in the aperture member 80. This feature makes it possible to increase tolerance of the manufacturing precision of the aperture member 90 and the assembling precision to the liquid crystal light valve display device 52. Incidentally, in the event that the condensing portions for the ordinary light L1 and the extraordinary light L2 are not sufficiently separated on the opening 92 of the aperture member 90, there is such a fear that a part of the extraordinary light L2 passes through a part of the phase difference plate 86. However, the extraordinary light L2 is cut by the polarizer 74 constituting the liquid crystal panel 62, and thus noise light is not generated, while the luminance is somewhat reduced. Consequently, according to the polarized light synthesizing device 88 thus arranged, it is possible to form the polarization separation element 78 thinly, thereby reducing the cost of manufacturing.

Figure 7:
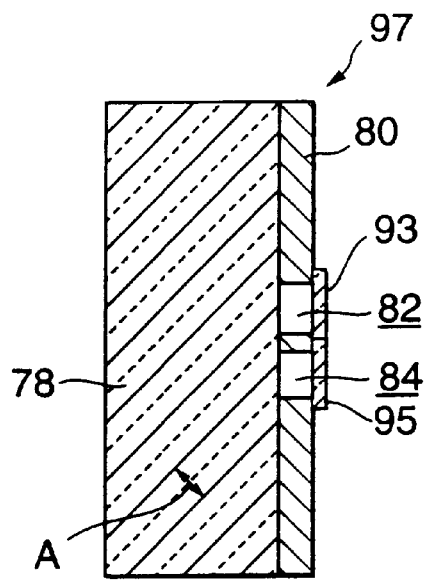
FIG. 7 is a sectional construction view of a polarized light synthesizing device according to another alternative embodiment.

Incidentally, in the event that as shown in FIG. 7, a polarized light synthesizing device 97 is arranged in such a manner that a phase difference plate 93 for rotating the polarization plane of the ordinary light L1, for example, +45°, and a phase difference plate 95 for rotating the polarization plane of the extraordinary light L2, for example, −45° are mounted on the openings 82 and 84 formed on the aperture member 80, or the opening 92 formed on the aperture member 90, it is possible to implement coincidence of the polarization plane of the ordinary light L1 with the polarization plane of the extraordinary light L2.

Figure 8:
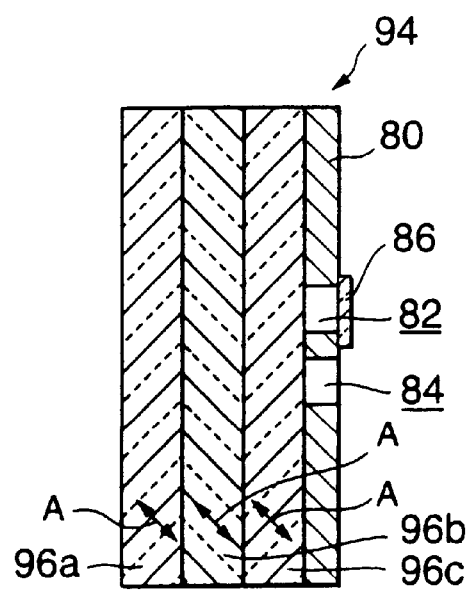
FIG. 8 is a sectional construction view of a polarized light synthesizing device according to another alternative embodiment.

FIG. 8 shows a polarized light synthesizing device 94 using polarization separation elements 96a–96c including a plurality of double refractive elements. A crystal as the double refractive element is generally a natural stone and thus there are very few crystals. In view of the foregoing, laminating a plurality of double refractive crystals having a coincidence in direction of the optical axis makes it possible to establish a desired distance between the normal light L1 and the abnormal light L2, and thereby contributing to reduction of the cost.

Figure 9:
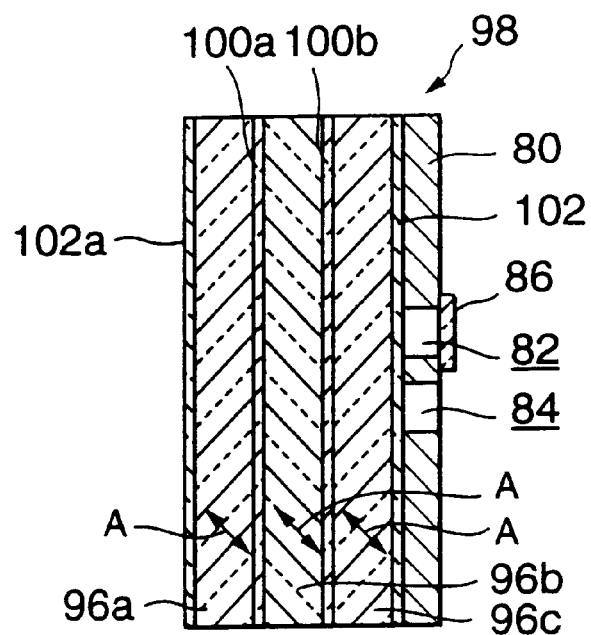
FIG. 9 is a sectional construction view of a polarized light synthesizing device according to yet another alternative embodiment.

As in the polarized light synthesizing device 94 shown in FIG. 8, in the event that the polarization separation elements 96a–96c are directly superposed, many interfaces appear and thus it is considered that the loss due to the interfacial reflection occurs. In view of the foregoing, as in the polarized light synthesizing device 98 shown in FIG. 9, layers 100*a* and 100*b* consisting of liquid or hardening substance (e.g. ultraviolet rays hardening substance) wherein its refractive index substantially matches to the polarization separation elements 96*a*–96*c* are provided and joined with one another among the polarization separation elements 96*a*–96*c*, and in addition reflection reducing layers 102*a* and 102*b* are provided on the surfaces of the polarization separation elements 96*a* and 96*c*, respectively. This feature makes it possible to suppress the loss due to the interfacial reflection of the lights L.

Figure 10:
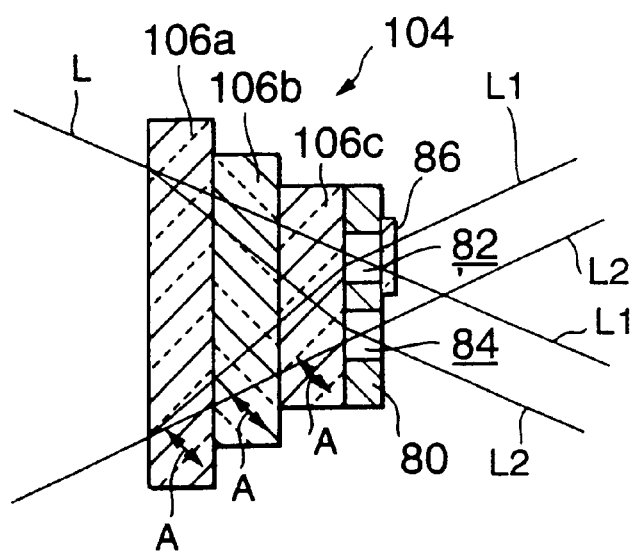
FIG. 10 is a sectional construction view of a polarized light synthesizing device according to still another alternative embodiment.

Further, according to the present embodiment, as shown in FIG. 1, since there is provided such an arrangement that the lights L are condensed on the polarized light synthesizing device 50, the lights L are incident upon the polarization separation element 78 in the form of the conical light in which the main ray is expressed in the form of the generating line. In view of the foregoing, as in a polarized light synthesizing device 104 shown in FIG. 10, there is provided an arrangement that polarization separation elements 106*a*–106*c* gradually become small toward the aperture member 80. This arrangement makes it possible to further reduce the manufacturing cost.

FIGS. 11A and 11B, FIGS. 12A and 12B, and FIGS. 13A and 13B show various types as to external configurations of the double refractive crystal used in the polarized light synthesizing device and directions of the optical axis of the crystal.

Figure 11A:
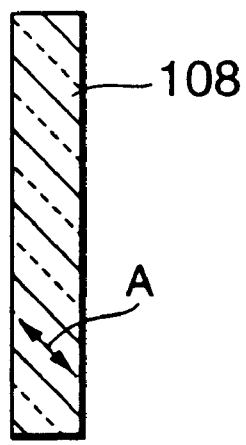
FIGS. 11A and 11B are sectional view and a front view of a polarization separating device according to the present embodiment, respectively.
Figure 11B:
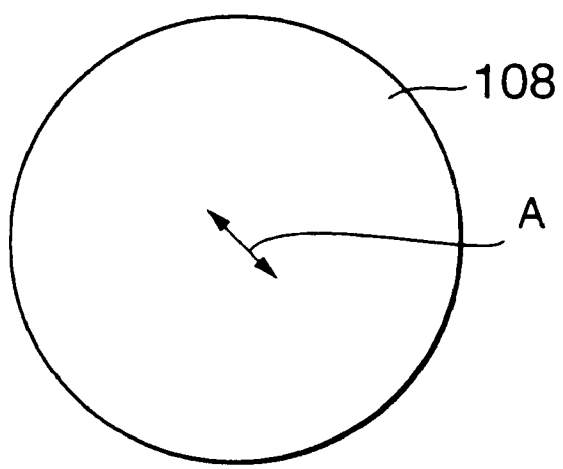

FIGS. 11A and 11B show a polarization separation element 108 which is shaped as a disk to meet the outline of the lights L to be transmitted. In the polarization separation element 108, the optical axis is inclined with respect to a direction of the thickness. The use of the polarization separation element 108 makes it possible to separate the light L into the normal light L1 and the abnormal light L2 effectively utilizing the area.

Figure 12A:
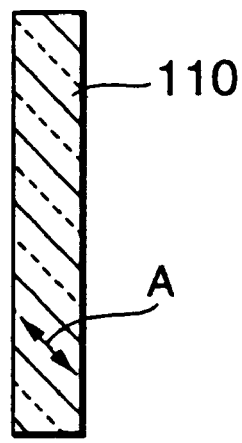
FIGS. 12A and 12B are a sectional view and a front view of a polarization separating device according to an alternative embodiment, respectively.
Figure 12B:
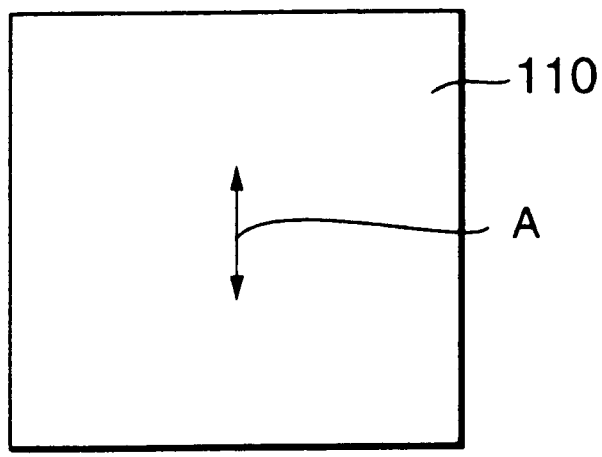
Figure 13A:
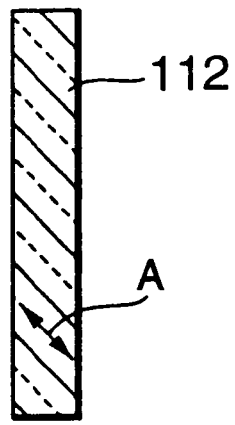
FIGS. 13A and 13B are a sectional view and a front view of a polarization separating device according to another alternative embodiment, respectively.
Figure 13B:
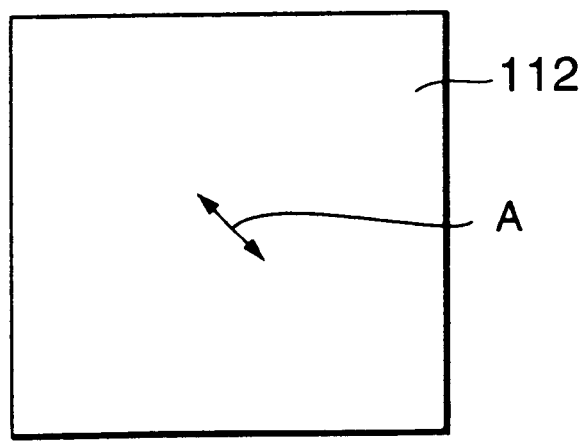

FIGS. 12A and 12B show a polarization separation element 110 which is shaped as a quadrilateral. The use of the polarization separation element 110 shaped as a quadrilateral makes it possible, for example, in case of the polarized light synthesizing device 50, to readily perform work in which an optical axis of the double refractive element is aligned with the arrangement direction of the opening 82 and 84 formed on the aperture member 80, and in addition to readily perform work for mounting on the liquid crystal light valve display device 52. Incidentally, as shown in FIGS. 13A and 13B, in the event that the direction of the optical axis is set up to be a diagonal direction of a polarization separation element 112, for example, even if the thickness of the polarization separation element 112 is large, so that a separation distance between the normal light L1 and the abnormal light L2 becomes large, there is no fear that the abnormal light L2 is associated with the edge portion of the polarization separation element 112.

Figure 14:
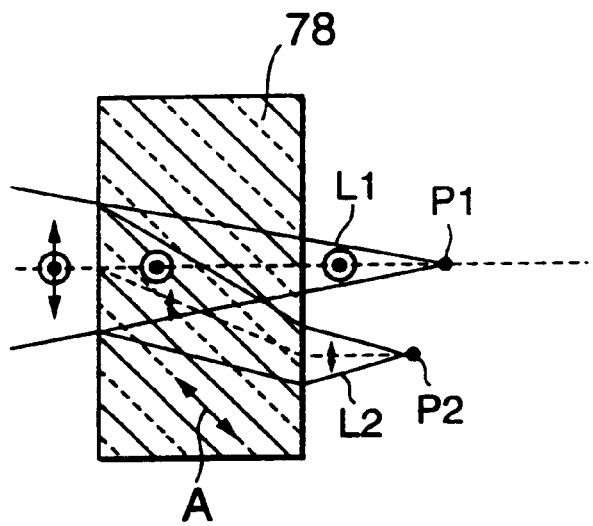
FIG. 14 is a detailed sectional explanation view of a condensing point of lights separated by the polarization separating device shown in FIG. 2.
Figure 15:
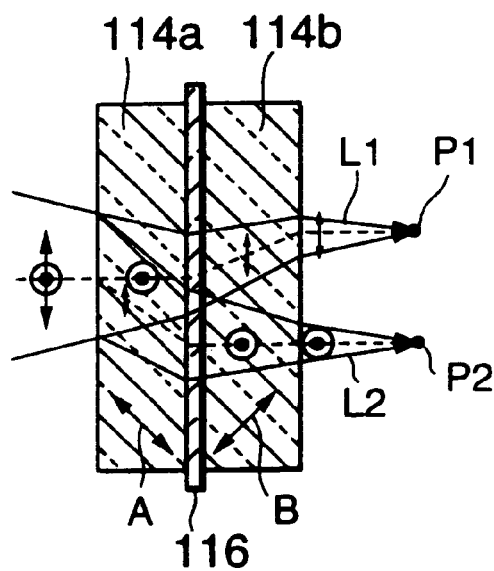
FIG. 15 is a sectional view of a polarization separating device according to an alternative embodiment.

Further, to strictly consider the abovementioned embodiment, for example, the normal light L1 and the abnormal light L2 passed through the polarization separation element 78 are condensed at mutually different points P1 and P2, as shown in FIG. 14, owing to the different optical length. This is emphasized with thicker polarization separation element 78. In view of the foregoing, as shown in FIG. 15, two polarization separation elements 114*a* and 114*b*, which are disposed in such a manner that the optical axes become symmetrical, are joined with each other via a phase difference plate 116. The use of the phase difference plate 116 thus arranged serves to interchange the normal light L1 and the abnormal light L2 so that the same optical path length is provided. Therefore, there is obtained a match of the points P1 and P2 on which the normal light L1 and the abnormal light L2 are condensed, respectively.

Figure 16:
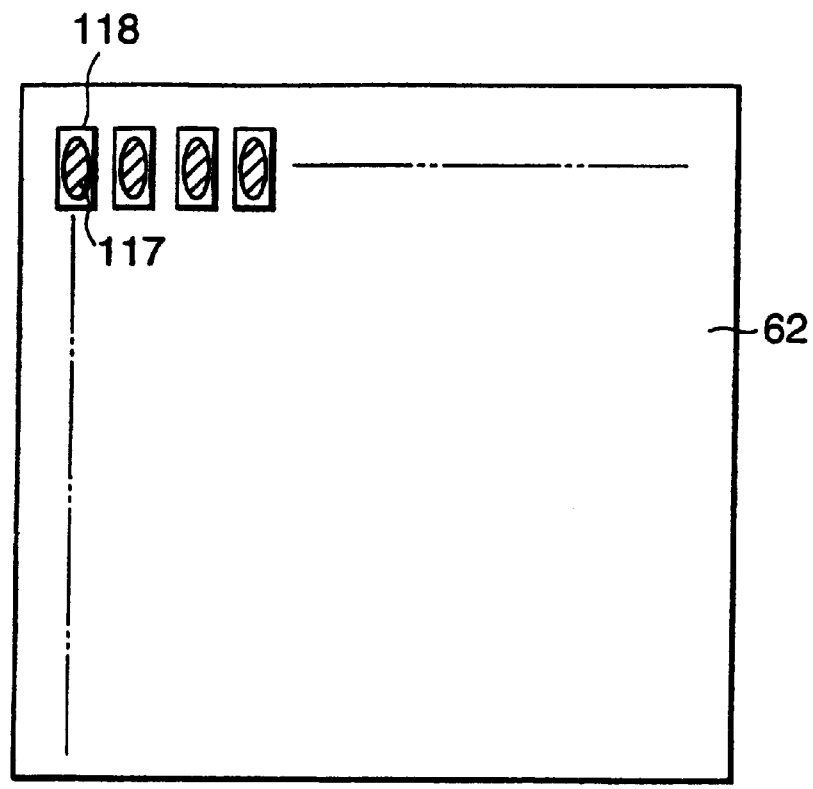
FIG. 16 is an explanatory view useful for understanding the configuration of a macro lens array provided in front of a liquid crystal panel.
Figure 17:
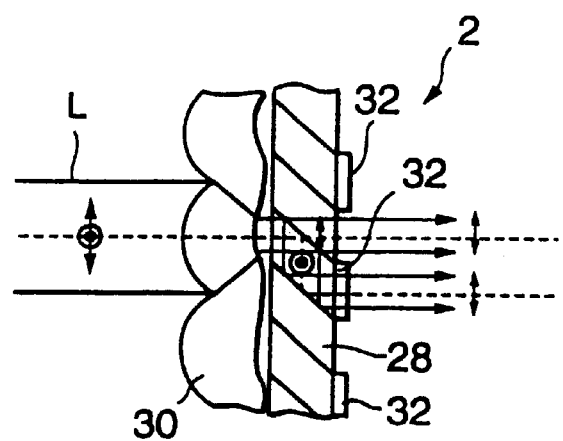
FIG. 17 is a sectional construction view of a polarized light synthesizing device according to the earlier technology and FIG. 18 is a schematic construction view of a liquid crystal light valve display device according to the earlier technology.

On the other hand, with respect to the liquid crystal panel 62, in order to implement the high luminance, there is one arranged in such a manner that a macro lens array is disposed in the front of the liquid crystal panel 62, dots formed on the liquid crystal 72 are illuminated. In this case, as shown in FIG. 16, the lights L passed through the openings 82 and 84 in the aperture member 80 constituting the polarized light synthesizing device 50 offer a luminance distribution 117 extended in the arrangement direction of the openings 82 and 84. In view of the foregoing, a macro lens array consisting of a plurality of refraction type lenses or diffraction type lenses are disposed in front of the crystal panel 62, and an aperture 118 extended in the arrangement direction of the openings 82 and 84 is formed on each dot. This arrangement makes it possible to effectively illuminate the crystal panel 62.

According to the above-mentioned embodiments, the double refractive crystal is used as the polarization separation element. However, any one is acceptable, as the polarization separation element, which offers double refractive properties, for example, one in which a thick liquid crystal layer is formed and aligned, and another one in which a polymer film is expanded so that double refractive properties appear, and the optical axis direction is controlled.

According to the present invention, there is provided such an arrangement that an aperture member is disposed in the vicinity of a condensing portion for a normal light and an abnormal light separated by a polarization separating element, and a polarization rotating element provided on the aperture member rotates a polarization plane of at least one of the normal light and the abnormal light. This feature makes it possible to implement compactness of a polarized light synthesizing device in its entirety, and in addition to perform synthesis of the polarized lights with low cost and high efficiency. Further, according to a display device using the polarized light synthesizing device of the present invention, it is possible to implement compactness of the display device, and in addition to effectively illuminate an image formed on the liquid crystal and display a large image plane of high luminance.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A polarized light synthesizing device, comprising:
    a polarization separation element for separating light into ordinary light and extraordinary light; and
    an aperture member defining apertures through which the ordinary light and the extraordinary light pass, and a polarization rotator element to rotate a polarization plane of at least one of the ordinary light and the extraordinary light to match polarization planes of the ordinary light and the extraordinary light with one another after exiting said aperture member, said aperture member being disposed at an emission side of said polarization separation element.

2. A polarized light synthesizing device according to claim 1, wherein said polarization separation element has an incidence plane and an emission plane for a source light, and said polarization separation element consists of a double refractive element in which an optical axis is set up at a slant with respect to an incidence direction of the source light.

3. A polarized light synthesizing device according to claim 2, wherein the incidence plane and the emission plane of said polarization separation element are parallel to one another.

4. A polarized light synthesizing device according to claim 2, wherein said polarization separation element is constructed in such a manner that a plurality of said double refractive elements are laminated.

5. A polarized light synthesizing device according to claim 4, wherein a plurality of said double refractive elements are joined with one another via a liquid or hardening substance and wherein a refractive index substantially matches each of said double refractive elements.

6. A polarized light synthesizing device according to claim 2, wherein said polarization separation element has a reflection reducing layer on at least one of the incidence plane and the emission plane.

7. A polarized light synthesizing device according to claim 2, wherein said polarization separation element is of a quadrilateral shape in an external configuration, in which an optical axis is set up at a slant with respect to an incidence direction of the source light and is set up at a slant with respect to a diagonal of said polarization separation element.

8. A polarized light synthesizing device according to claim 1, wherein said polarization separation element is arranged in such a manner that optical path lengths of the ordinary light and the extraordinary light become equal to one another.

9. A polarized light synthesizing device according to claim 8, wherein said polarization separation element comprises:

two double refractive elements, each having an optical axis set up at a slant with respect to an incidence direction of the light; and a phase difference plate disposed between said two double refractive elements, wherein the optical axes of said two double refractive elements are set up symmetrically with respect to said phase difference plate.

10. A polarized light synthesizing device according to claim 1, wherein said polarization separation element is calcite.

11. A polarized light synthesizing device according to claim 1, wherein said apertures and said polarization rotator element are formed in a unitary body.

12. A polarized light synthesizing device according to claim 1, wherein said polarization rotator element is a phase difference plate for rotating 90° a polarization plane of one of the ordinary light and the extraordinary light to be coincident with another polarization plane.

13. A polarized light synthesizing device according to claim 1, wherein said polarization rotator element is calcite.

14. A display device, comprising:

a light source;

a polarization separation element for separating light emitted from said light source into ordinary light and extraordinary light;

an aperture member defining apertures through which the ordinary light and the extraordinary light pass, and having a polarization rotator element for rotating a polarization plane of at least one of the ordinary light and the extraordinary light to match polarization planes of the ordinary light and the extraordinary light with one another after exiting said aperture member, said aperture member being disposed at an emission side of said polarization separation element; and a liquid crystal panel in which a polarization plane of each pixel is controlled in accordance with an image, wherein lights, in which polarization planes are matched with one another by said aperture member, are applied to said liquid crystal panel to display an image.

15. A display device according to claim 14, wherein said liquid crystal panel has a plurality of refraction type lenses or diffraction type lenses and openings extended in association with separation directions of the ordinary light and the extraordinary light.

16. A polarized light synthesizing device according to claim 1, wherein said polarization separation element has an incidence plane and an emission plane for a source light, and said polarization separation element includes a double refractive element in which an optical axis is set up at a slant with respect to an incidence direction of the source light.

* * * * *